3,232,998
PURIFICATION OF ALCOHOLS
Arthur Homer Neal, Baton Rouge, La., assignor to Esso
Research and Engineering Company, a corporation of
Delaware
No Drawing. Filed Dec. 14, 1961, Ser. No. 159,442
2 Claims. (Cl. 260—643)

The present invention relates to a method for refining alcohols. More particularly, this invention relates to a process for removing carbonyl contaminants from alcohols. Still more particularly, the invention relates to a process wherein alcohols containing small amounts of carbonyl impurities, such as oxo alcohols, are contacted at elevated temperatures with a polyhydric acetalization agent capable of forming stable cyclic derivatives of said carbonyl impurities to provide alcohols of reduced carbonyl content.

The production of synthetic alcohols involves a variety of operations, among which may be mentioned oxidations, reductions, and the carbonylation or oxo reaction. In all these operations, other oxygenated byproducts are formed in addition to the desired alcohols. Distillation processes are generally suitable for removing gross amounts of these byproducts. Such techniques are often unsuited, however, for removing small residual amounts of oxygen containing impurities. The presence of even small amounts of such contaminants in the finished alcohol drastically limits the uses to which it may be put. For example, synthetic alcohols are used extensively in the production of plasticizers for synthetic resins. However, the color qualities and electrical characteristics of the plasticizers and, in turn, of the resin compositions are adversely affected by contaminants in the synthetic alcohols. The process of the present invention is directed to the removal of such impurities, particularly the removal of carbonyl compounds.

For purposes of simplifying the description of the invention, reference will be made specifically to the refining of alcohols derived from olefins via the oxo synthesis; however, the invention is not limited thereto, but is applicable generally to alcohols having from 6 to 30 carbon atoms which contain small amounts, e.g., from 0.05 to 10 wt. percent of aldehyde and/or ketone contaminants, preferably 0.1 to 3 wt. percent.

In the oxo process, compounds having olefinic double bond, preferably olefins having from 2 to 15 carbon atoms, are reacted in the presence of a carbonylation catalyst with carbon monoxide and hydrogen at elevated temperatures and pressures. The primary products of this reaction are aldehydes having one more carbon atom than the olefin feed, other oxygenated products being formed but to a lesser degree. The aldehydes thus produced are subsequently hydrogenated to the corresponding alcohols which in turn may be esterified to produce plasticizers and other useful compositions.

While the oxo reaction is highly useful in the production of a variety of alcohols, the rate of reaction generally drops off as the size of the olefin increases. Hence, for the production of intermediate and higher alcohols, e.g., 8 to 30 carbon atoms, a modification of the oxo process, commonly called the aldox process, is especially suitable. In this modification, a modifying catalyst, generally comprising zinc, is added to the oxo reactor. The presence of this modifying catalyst effects the dimerization of the oxo aldehydes concurrently with their formation. In this way, aldehydes having twice plus two the number of carbon atoms of the original olefin feed are produced. Hydrogenation of these aldehydes provides the corresponding alcohols. For further descriptions of the oxo and aldox processes, reference may be had to U.S. 2,827,491, U.S. 2,811,567 and U.S. 2,820,067.

The alcohols produced by the above described process are contaminated to a greater or lesser degree, depending somewhat on the oxonation and hydrogenation conditions, with carbonyl compounds, i.e., aldehydes and/or ketones. Alcohols having more than a minimum carbonyl content, e.g., about 0.02 wt. percent are not suitable for many industrial applications, as pointed out hereinbefore. A customary method of reducing the carbonyl content has been to hydrogenate the crude liquid oxo or aldox product as completely as practicable without unduly increasing the formation of bottoms or high boiling byproducts. However, it has been generally experienced that carbonyl impurities are not completely removed in this manner. To reduce the amount of these residual impurities, attempts have been made to concentrate them in a lower boiling front-end or "smear" cut during the finishing distillation. Such a procedure is not completely satisfactory, however, for considerable loss of valuable alcohol occurs through discard of the "smear" cut, and in the case of higher alcohols, the boiling range of the carbonyl contaminants and the alcohols overlap, e.g. $C_6$ to $C_{30}$ alcohols.

These and other disadvantages are overcome by the present process wherein a carbonyl contaminated alcohol product, such as is derived from the hydrogenation of oxo and aldox aldehydes, is treated at elevated temperatures with a polyhydric acetalization agent capable of reacting with the carbonyl contaminants to form cyclic acetals and/or ketals. These cyclic derivatives of the carbonyl contaminants are thermally stable and have relatively high boiling points; therefore, the desired alcohol can readily be separated therefrom by simple fractional distillation means. In this manner, a finished alcohol of reduced carbonyl content is readily obtained, and esters of improved color quality and other desirable characteristics can be provided.

The acetalization agents of the present invention are organic materials having a plurality of hydroxyl groups capable of reacting with aldehydes and/or ketones to form cyclic acetals and/or ketals. More particularly, the acetalization agents are organic compounds containing at least two hydroxyl groups which are separated by 2 to 3 carbon atoms so that upon reaction with the carbonyl contaminants, cyclic structures of 5 to 6 ring members are produced. Among the acetalization agents which satisfy these requirements are the alkylene glycols, for example, ethylene glycol, 1,2- and 1,3-propylene glycol, 1,2- and 1,3-butylene glycol, and the higher 1,2- and 1,3-alkylene glycols. Cycloalkylene glycols, e.g., 1,2- and 1,3-dihydroxycyclopentanes and cyclohexanes, triols such as glycerol and trimethylol propane, pentaerythritol, and polyvinyl alcohol, as well as other polyalcohol type polymers, including sugars and starches, are also satisfactory acetalization agents for the present process. These acetalization agents are saturated polyhydric alcohols which are unsubstituted.

As can be seen from the above description, a wide variety of polyhydric organic materials may be used in the present invention. It is preferred, however, to use the liquid acyclic polyhydric alcohols, and especially, the acyclic diols and triols having from 2 to 6 carbon atoms wherein at least two of the hydroxyl groups are separated by not more than 3 carbon atoms. When liquid acetalization agents are used, it is advantageous to select one having a boiling point substantially higher than that of the alcohol to be treated, so as to facilitate the separation of unreacted acetalization agent from the treated alcohol.

In carrying out the process of the present invention, the crude alcohol and acetalization agent are intimately contacted such as by mixing at a temperature sufficient to induce reaction of the carbonyl contaminants and the acetalization agent. Generally, a temperature between 100 and 400° F. is suitable, with temperatures at or below the boiling temperature of the alcohol being preferred. A convenient method for treating the contaminated alcohol consists of heating the alcohol in intimate admixture with the polyhydric acetalization agent at the reflux temperature. Small amounts of a nonvolatile acid, e.g. 0.1 wt. percent based on alcohol, can be added to catalyze the reaction.

The pressure at which the process is conducted is not critical. Atmospheric, reduced or elevated pressures are suitable, the choice to some extent being dictated by the particular alcohol undergoing treatment. For example, with low boiling alcohols, it may be desirable to conduct the treatment at elevated pressure in order to increase the treating temperature without exceeding the boiling point of the alcohol. On the other hand, with higher boiling alcohols, it may be desirable to reduce the pressure so as to reduce the treating temperature.

The time of treatment can also be varied widely and will, of course, be somewhat dependent upon the treating temperature. That is to say, treatment at higher temperatures in general requires less time than treatment at lower temperatures. For most purposes, treating times of from about 10 minutes to 4 hours are suitable.

The amount of acetalization agent used in the process of the invention is not critical; however, sufficient treating agent should be utilized to react with all the carbonyl impurities present. Large excesses of treating agent do not appreciably increase the effectiveness of the treatment, and since such large excesses will require increased size of the treating and purification equipment, they generally are to be avoided. About 1 to 10 moles of the acetalization agent per mole of carbonyl contaminant has been found to be generally effective and is to be preferred.

An example of the application of the process to a specific alcohol product will further illustrate the advantages of the present invention.

A $C_8$ alcohol product containing carbonyl contaminants was obtained in the following way: Propylene was reacted with carbon monoxide and hydrogen under typical aldox conditions including a temperature of about 350° F. and a synthesis gas (1.5 mole $H_2$/mole CO) pressure of about 3000 p.s.i.g. and in the presence of 0.3 wt. percent cobalt oleate and 0.2 wt. percent zinc oleate, each calculated as metal on olefin feed. The crude aldox product was de-metaled by treatment with aqueous acetic acid. The components boiling below $C_8$ were stripped from the de-metaled product, and the $C_8+$ residue then hydrogenated over a supported molybdenum sulfide catalyst at a temperature of about 475° F. and a hydrogen pressure of about 3000 p.s.i.g. The hydrogenated $C_8+$ product contained about 44–46 wt. percent $C_8$ alcohol and about 1.3 wt. percent of close-boiling carbonyl impurities.

In accordance with the process of the present invention, a portion of the hydrogenated $C_8+$ product was refluxed at atmospheric pressure for 1 hour with 1 wt. percent glycerine, i.e. slightly in excess of about 1 mole glycerine per mole carbonyl impurities. The glycerine-treated product was then distilled to yield a "front end" $C_8$ alcohol cut, a 2-ethylhexanol fraction and "bottoms," i.e. components boiling above 2-ethylhexanol. The carbonyl content of the fractions from the glycerine-treated product was compared with similarly distilled, but untreated, product. The results are shown in Table I:

Table I

|  | Untreated | Treated |
|---|---|---|
| $C_8$ Alcohol "front end": |  |  |
| Vol. percent of charge | 10 | 12 |
| Carbonyl No | 4.87 | 0.73 |
| 2-ethylhexanol fraction: |  |  |
| Vol. percent of charge | 34 | 34 |
| Carbonyl No | 0.16 | 0.02 |

These data show the marked reduction in carbonyl content afforded by the process of this invention wherein glycerine is used as the acetalization agent. Similar reductions in carbonyl content are obtained by substituting for glycerine an equivalent amount of ethylene glycol, 1,2- or 1,3-propylene glycol, or 1,2-, 1,3- or 2,3-butylene glycol.

While the process of the invention has been illustrated by reference to specific embodiments, the invention is not limited thereto. As will be apparent to those skilled in the art, numerous modifications may be made without departing from the spirit of the invention. It is intended, therefore, that the invention be limited solely by the scope of the appended claims.

What is claimed is:

1. A process for purifying 2-ethylhexanol by separation from close boiling carbonyl impurities which comprises refluxing 2-ethylhexanol containing close boiling carbonyl impurities with from about 1 to 10 moles of a liquid, acyclic, saturated, unsubstituted $C_2$ to $C_6$ polyhydric alcohol selected from the group consisting of diols and triols per mole of said carbonyl impurities, said $C_2$ to $C_6$ polyhydric alcohol capable of forming cyclic derivatives with said carbonyl impurities, which cyclic derivatives have a higher boiling point than 2-ethyl hexanol, and distilling therefrom 2-ethylhexanol having a carbonyl number below 0.1.

2. A process in accordance with claim 1 wherein said polyhydric alcohol is glycerine.

References Cited by the Examiner

UNITED STATES PATENTS

| 2,658,069 | 11/1953 | Van der Waals | 260—643 |
| 2,664,435 | 12/1953 | Burton et al. | 260—643 |
| 2,719,180 | 9/1955 | Rottig | 260—643 |
| 2,811,567 | 10/1957 | Mason | 260—638 X |
| 2,820,067 | 1/1958 | Mertzweiller et al. | 260—638 X |

FOREIGN PATENTS

| 486,347 | 9/1952 | Canada. |
| 496,797 | 10/1953 | Canada. |

LEON ZITVER, *Primary Examiner.*